B. E. DE VOL AND J. R. MONCRIEF.
AUTOMOBILE TOWING BAR.
APPLICATION FILED DEC. 22, 1920.
1,426,155.
Patented Aug. 15, 1922.
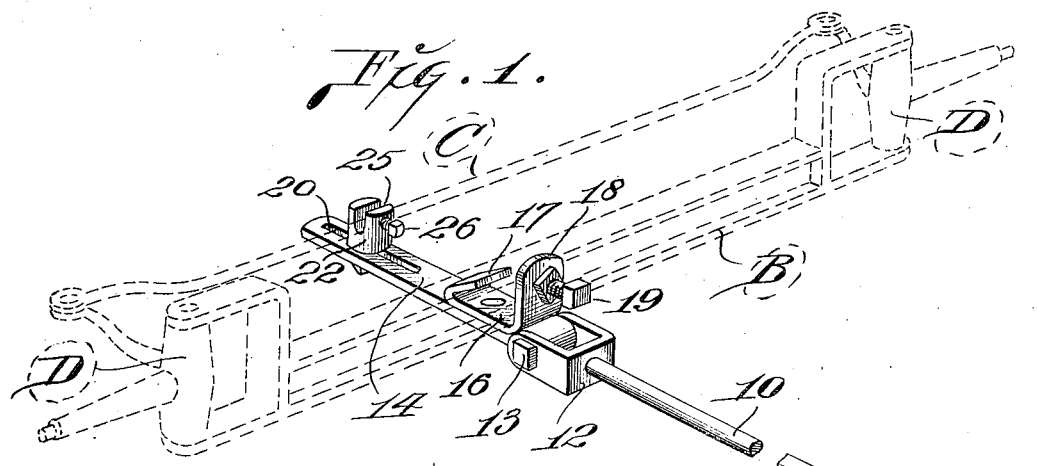
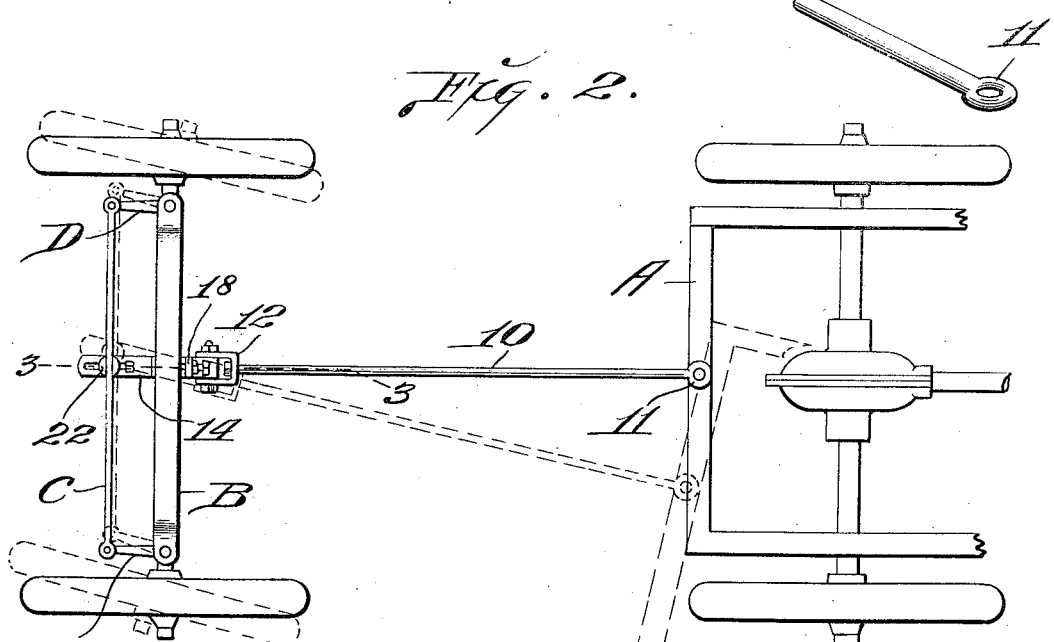
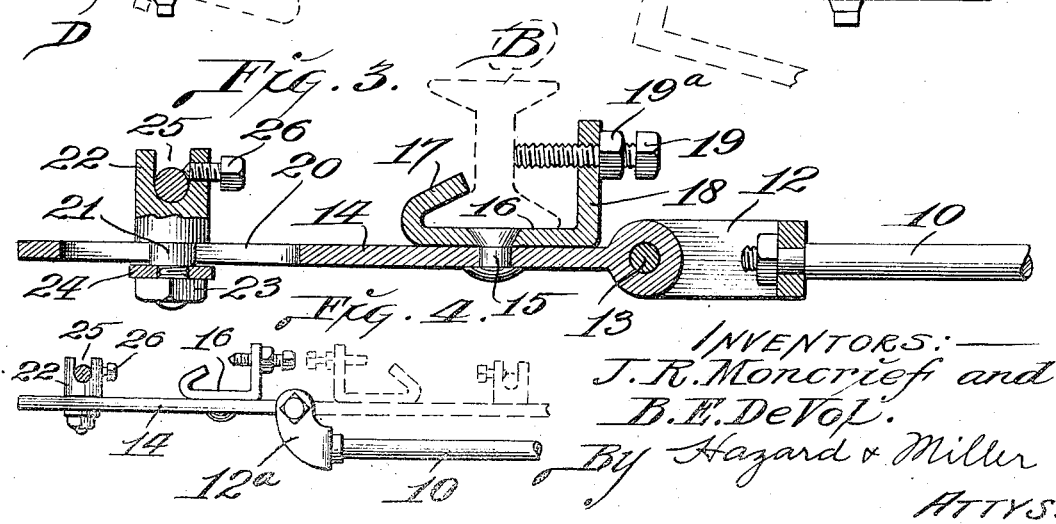
INVENTORS:—
J. R. Moncrief and
B. E. DeVol.
By Hazard & Miller
ATTYS.

UNITED STATES PATENT OFFICE.

BART E. DE VOL AND JESSE R. MONCRIEF, OF SANTA ANA, CALIFORNIA, ASSIGNORS TO UNIVERSAL MANUFACTURING COMPANY, OF SANTA ANA, CALIFORNIA, A CORPORATION OF CALIFORNIA.

AUTOMOBILE TOWING BAR.

1,426,155.            Specification of Letters Patent.      Patented Aug. 15, 1922.

Application filed December 22, 1920. Serial No. 432,610.

*To all whom it may concern:*

Be it known that we, BART E. DE VOL and JESSE R. MONCRIEF, citizens of the United States, residing at Santa Ana, in the county of Orange and State of California, have invented new and useful Improvements in Automobile Towing Bars, of which the following is a specification.

Our invention relates generally to motor vehicle appliances, and more particularly to a device in the nature of a coupling bar that is particularly designed for use in towing a motor vehicle when the latter, or some of its operative parts, become broken or disabled so as to prevent the operation of the vehicle under its own power.

The principal objects of our invention are to generally improve upon and simplify the construction of devices of the type to which our invention relates, to provide a towing bar that is relatively simple in construction, thereby permitting it to be easily and cheaply manufactured and to be readily applied for use upon motor vehicles, further, to provide a relatively small, compact and efficient device that will supplant the ordinary tow rope or chain now commonly used for towing motor vehicles, and further, to construct the towing bar so that the vehicle that is being towed will properly follow the front or towing vehicle without requiring the services of a person in the towed vehicle for the purpose of operating the steering gear thereof.

With the foregoing and other objects in view, our invention consists in certain novel features of construction and arrangement of parts that will be hereinafter more fully described and claimed and illustrated in the accompanying drawings, in which:

Fig. 1 is a perspective view of a towing bar of our improved construction, with dotted lines showing the motor vehicle axle and transverse steering rod to which the towing bar is connected.

Fig. 2 is a plan view of parts of two motor vehicles and showing our improved towing bar connected thereto.

Fig. 3 is an enlarged section taken approximately on the line 3—3 of Fig. 2.

Fig. 4 is a side elevational view of a part of a modified form of the towing bar.

Referring by numerals to the accompanying drawings which illustrate a practical embodiment of our invention, 10 designates the main body portion of the bar, which may be constructed of a solid rod or a section of tubing, such as gas pipe, and formed integral with or fixed to the forward end of this bar is a loop or hook 11, by means of which the bar may be readily secured to the frame or some fixed part of a towing vehicle such as A.

Secured in any suitable manner to the rear end of the bar is a horizontally disposed U-shaped yoke 12, and passing through the rear portions of the legs of said yoke is a pin or bolt 13, upon which is pivotally arranged the forward end of a rearwardly projecting horizontally disposed plate 14.

An axle engaging hook or bracket is pivotally arranged on the forward portion of plate 14 by means of a vertically disposed pin or rivet 15, and said hook or bracket comprises a horizontally disposed base plate 16, one end of which terminates in a rebent hook 17, and the opposite end being extended vertically upward to form a bearing 18 for a screw or bolt 19, and which latter is provided with a lock nut 19$^a$.

The hook 17 is preferably inclined and formed so as to fit snugly over one of the base flanges of the front axle of a vehicle, and which latter are usually of I-beam shape in cross section.

Formed in the rear portion of plate 14 is a longitudinally disposed slot 20 and arranged to slide freely therein is a stud 21 that depends from a U-shaped block 22, and to retain this block in position upon the plate, the lower end of the stud is threaded and receives a nut 23 and washer 24.

The opening 25 in block 22 is of sufficient width and depth to receive the usual transverse bar C that forms a part of the steering gear of a motor vehicle, and which bar connects the steering knuckles D that are journaled on vertical axes by the ends of the front axle B.

A set screw 26 is seated in the upper portion of block 22 to the side of the opening 25 therein, and which screw is utilized for rigidly securing the steering bar to said block.

To attach our improved bar to a motor vehicle that is to be towed, the screws 19 and 26 are retracted a sufficient distance to permit the plate 14 and parts carried thereby to be applied to the axle B and steering rod C, with the latter positioned in the notch 25 and the base of the front axle B positioned on plate 16 between hook 17 and upright end portion 18.

Screw 26 is now tightened to rigidly connect block 22 with the transverse steering rod C, after which bolt 19 is manipulated so that its end bears against the web of axle B, thereby clamping the latter against hook 17, and said screw 19 is locked in its axle engaging position by proper manipulation of lock nut 19ª.

It will be understood that block 22 slides freely lengthwise of slot 20. Consequently, said block can be very readily adjusted to accommodate steering bars that are arranged at various distances to the rear of the axle.

The front end of bar or rod 10 is connected to the frame, or some fixed part of the towing vehicle, and thus a firm and substantial coupling between two vehicles is provided. When the front, or towing, vehicle turns laterally in either direction the forward end of bar 10 will be correspondingly swung laterally with the result that plate 14 will pivot on pin 15 and the rear portion of said plate will swing laterally in a direction opposite to the direction in which the forward end of rod 10 is shifted, and which action shifts steering rod C laterally a short distance, thereby swinging the steering knuckles D upon their vertical axes and correspondingly shifting the positions of the front wheels of the towed vehicle so that the same will properly follow or trail the front or towing vehicle.

It will be understood that when our improved tow bar is attached to the vehicle that is to be towed, the driving connection between the lower end of the steering post and the transverse steering rod G must be temporarily disconnected, for if the same were maintained, it would prevent the lateral shifting movement of said steering rod by our improved device as above described.

Dotted lines in Fig. 2 show the positions assumed by the parts of our improved tow bar, the front wheels of the towed vehicle and the transverse steering rod of the latter, when the front or towing vehicle makes a turn to one side.

In some makes of motor vehicles, the transverse steering rod is positioned in front of the front axle, and in order that our improved device may be applied to vehicles of this type, the yoke that is secured to the rear end of the rod or bar 10 may have its legs 12ª projected upwardly a short distance, as illustrated in Fig. 4, and this will permit the plate 14 and parts carried thereby, to be connected to said yoke so that it projects rearwardly or forwardly therefrom.

A towing bar of our improved construction is comparatively simple, is very strong and durable and comprises relatively few parts, thereby enabling it to be easily and cheaply manufactured, and said bar can be applied to or removed from towing and towed vehicles with the expenditure of very little time and labor.

It will be readily understood that minor changes in the size, form and construction of the various parts of our improved towing bar may be made and substituted for those herein shown and described without departing from the spirit of our invention, the scope of which is set forth in the appended claim.

We claim as our invention:

An automobile towing bar comprising a main bar having an attachment means at its forward end, a U-shaped yoke secured to the rear end of the bar and having its arms extending backwardly in horizontal planes, a pin extending through the rear ends of the yoke arms, a plate fitting between the yoke arms and having a bearing through which the pin extends, a bracket mounted upon the plate near its forward end and having a horizontally disposed base plate, one end of which terminates in a rebent hook and the other end of which extends vertically upwardly to form a bearing, a bolt mounted in the bearing, a lock nut upon the bolt, there being a longitudinally extending slot vertically through the rear end of the plate, a stud arranged to slide freely in the slot, a U-shaped block extending upwardly from the stud, and a set screw in the U-shaped block so that an axle may be placed in the bracket and held in place by the bolt and lock nut, and a steering gear rod placed in the U-shaped block and held in place by the set screw.

In testimony whereof we have signed our names to this specification.

BART E. DE VOL.
JESSE R. MONCRIEF.